Nov. 17, 1931.  A. C. GETZ ET AL  1,832,011
CLUTCH MECHANISM FOR LATHE CARRIAGES
Filed June 3, 1929  2 Sheets-Sheet 1

INVENTOR
A.C.Getz and
F.D.Dickas
BY
Siggers + Adams
ATTORNEYS

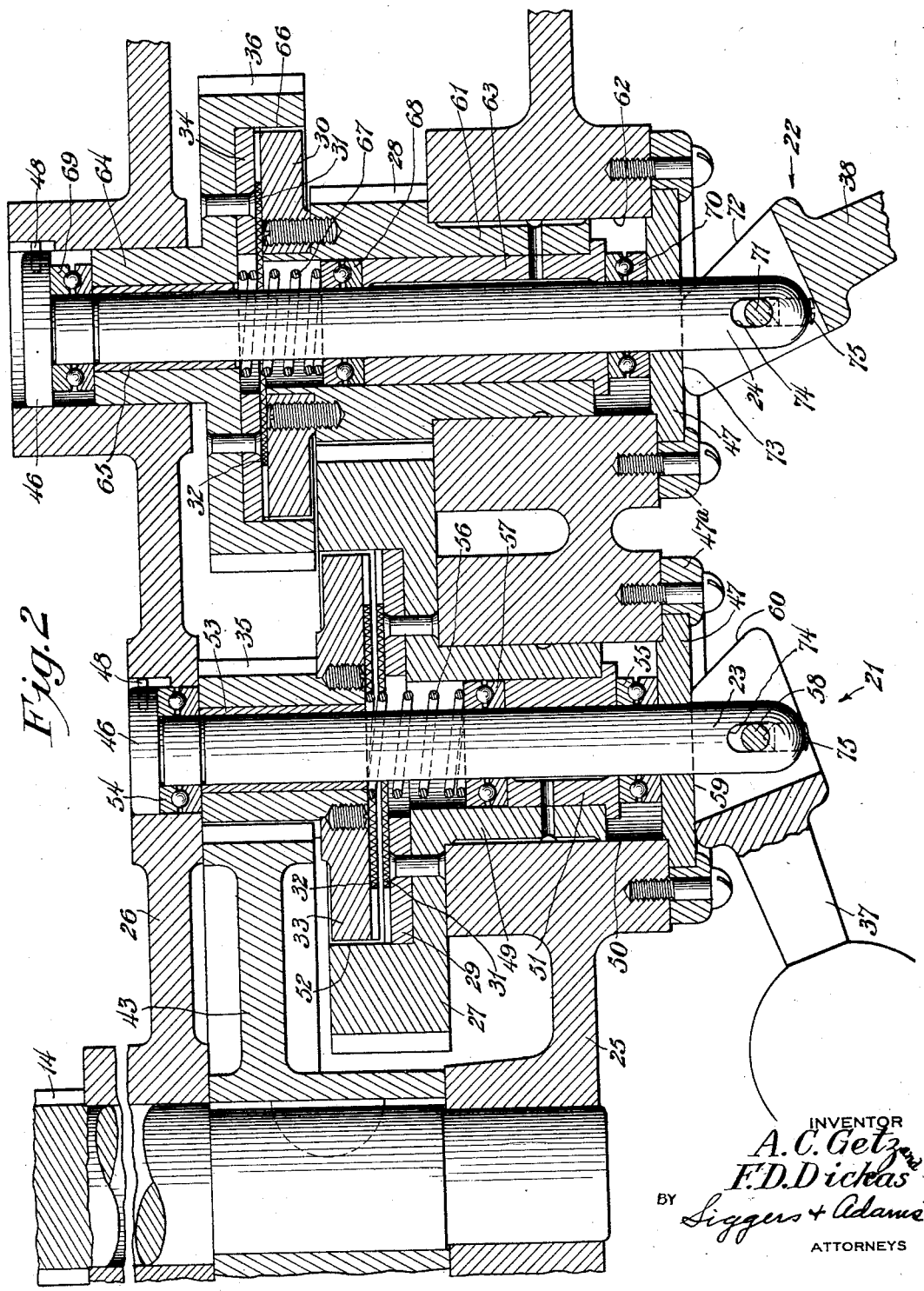

Patented Nov. 17, 1931

1,832,011

UNITED STATES PATENT OFFICE

ALFRED C. GETZ AND FREDERICK D. DICKAS, OF SIDNEY, OHIO

CLUTCH MECHANISM FOR LATHE CARRIAGES

Application filed June 3, 1929. Serial No. 367,993.

This invention relates to clutch mechanisms for the power feed of lathe carriages and cross slides and aims, among other objects, to provide improved positive clutches and clutch control means, particularly adapted to enable the clutches to be operated very quickly and conveniently.

In the drawings,

Fig. 2 is a sectional view taken on line 2—2 of Fig. 1 and drawn on a larger scale.

Figure 1:
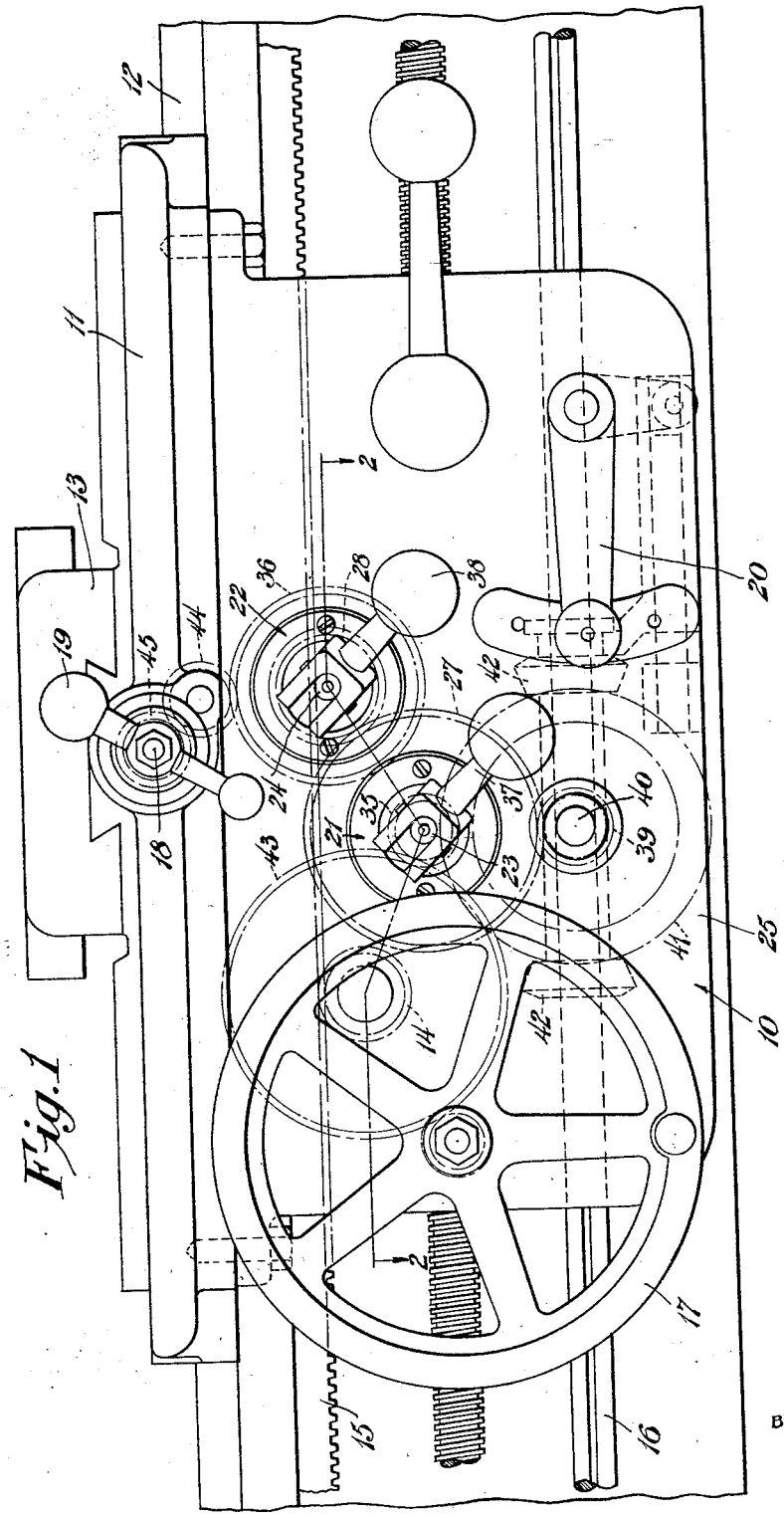
Fig. 1 is a side elevation of a lathe apron embodying the invention.
Figure 3:
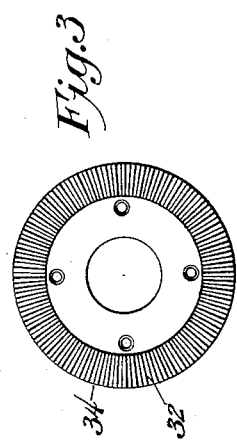
Fig. 3 is a face view of one of the clutch plates.

Referring particularly to the drawings, the improved clutches and control means are there shown as embodied in a lathe apron 10, secured to a carriage 11 which is slidable longitudinally in the ways on a lathe bed 12 and on the carriage a cross slide 13 is slidably mounted. The carriage is adapted to be propelled along the lathe bed by a spur gear 14 carried by the apron and engaging a stationary rack 15 on the lathe, the gear being driven either by power, through a train of gearing from the feed rod 16, or manually by means of a hand wheel 17. The cross slide is adapted to be moved transversely on the carriage by means of a cross-feed screw shaft 18, the shaft being rotated either by power, through another train of gearing from the feed rod 16, or by a handle 19. The direction of travel of the carriage or the cross slide is controlled by a handle 20 which manipulates the reversing bevel gears. The parts as thus far described are shown more or less diagrammatically in Fig. 1, as they are generally found in most lathes and do not need a detailed showing.

To control the movement of the carriage and cross slide, the present invention provides a positive snap-action clutch in each train of gearing. Referring to Fig. 2, the longitudinal feed clutch assembly 21 and the cross-feed clutch assembly 22 are shown as being of substantially the same general construction, though varying slightly in specific details. The assemblies broadly include a pair of parallel shafts 23 and 24 mounted transversely of the apron between the front and rear walls 25 and 26 respectively. Driving gears 27 and 28 are rotatably mounted on the shafts and are in mesh with each other. Secured to the gears are clutch elements 29 and 30, having radial teeth 31 which coact with similar teeth 32 on complementary clutch elements 33 and 34, secured to driven gears 35 and 36 rotatably mounted on the shafts 23 and 24 respectively. The clutches are operated by means of levers 37 and 38 on the front of the apron, which will be described in detail later.

The gear 27 is in mesh with a pinion 39 (Fig. 1) secured on a shaft 40 along with a bevel gear 41 which is adapted to be connected to one of the reverse bevel gears 42 on the feed rod 16. The driven gear 35 is in mesh with a gear 43 secured to the shaft carrying the pinion 14, so that when the clutch assembly 21 is operated, power will be transmitted from the feed shaft to the pinion 14. The driven gear 36 is in mesh with an idler gear 44 which meshes with a pinion 45 secured to the cross-feed shaft 18, so that when the clutch assembly 22 is operated, power will be transmitted from the feed rod 16.

The shafts 23 and 24 are formed with enlarged end portions or heads 46, which are mounted in bearing openings in the rear wall, while the other ends of the shafts extend through hardened plates 47 secured to the front wall by means of flange rings 47ª, the arrangement being such that the plates can be rotated for a purpose to be later described. The shafts are held against rotation by means of keys 48 engaging slots in the rear wall, but are capable of a slight axial movement.

Referring to the clutch assembly 21, the driving gear 27 is provided with a hub portion 49 which is journaled in a bearing opening 50 in the front wall and also journaled on the shaft 23 by means of a bushing 51 pressed into the end of the hub. The gear 27 is further provided with a recess 52 in its rear face in which is rigidly secured the clutch element 29, which is in the form of an annular ring. The driven gear 35 is journaled on the shaft 23 between the gear 27 and the rear wall 26 by means of a bushing 53 and the teeth 32 of the clutch element 33 secured to the gear 35 are normally spaced from, but are adapted to be moved into engagement with the teeth 31 of the clutch element 29. The depth of the recess 52 and the thickness of the clutch elements 29 and 33 are such that both elements are entirely within the gear to conserve space in the apron. The clutch elements are preferably made of hardened flat discs and removably secured to the respective gears so that they may be removed and replaced when worn. This greatly reduces the cost of construction and maintenance. A thrust bearing 54 is interposed between the end 46 of the shaft and the outer end of the gear 35, and another thrust bearing 55 is between the outer shouldered end of the bushing 51 and the plate 47. To hold the clutch elements apart, an expansile coiled spring 56 surrounds the shaft 23 and extends between the inner end of the gear 35 and a third thrust bearing 57 which abuts the inner end of the bushing 51.

To cause the clutch element 33 to engage the clutch element 29, the shaft 23 is moved toward the front of the apron by means of the control lever 37, located on the front of the apron, and having an inner bifurcated end, as shown, which is pivotally connected to the shaft by a pin 58 passing through the sides of the lever and through the shaft. The bifurcated end of the lever is provided with flat bearing faces 59 and 60 formed at an obtuse angle to each other, the pin being so located that the distance between the end faces 60 and the pin is greater than the distance between the side faces 59 and the pin. Further, the angle between the faces 59 and 60 is such that a line perpendicular to the faces 60 and passing through the pin will be near the apex of the angle. The difference in the distance between the apex and the pin and the distance between the side faces 59 and the pin is substantially equal to the distance the clutch element 33 has to move to engage the clutch element 29.

When the lever is in inoperative position, the faces 59 are held engaged with the plate 47 by the action of the spring 56. When the lever is moved to operative position, the apex of the faces forms a fulcrum for the lever, sliding over the plate 47 and causing the shaft 23 to be moved outwardly. When the apex of the faces is in alinement with the axis of the shaft, the clutch elements are tightly engaged with each other and upon further movement, the lever snaps over dead center, and the faces 60 engage the plate 47, when the lever is held in operative position until it is moved in the opposite direction over dead center. To release the clutch, it is only necessary to move the lever toward inoperative position until the apex of the faces passes the axis of the shaft, when the spring 56 will cause the lever to snap into inoperative position. By mounting the plates 47 so that they may be rotated, the bearing faces of the levers do not wear grooves in the surface of the plates.

Referring to the clutch assembly 22, the gear 28 is provided with a hub portion 61 journaled in a bearing opening 62 in the front wall 25 and secured to sleeve 63 journaled on the shaft 24. The gear 36, which overlaps the gear 27, has a hub portion 64 which extends into the bearing opening in the rear wall and is journaled on a sleeve 65 on the shaft 24. The gear is further provided with a recess 66 in the face adjacent to the gear 28 and in the recess is secured the clutch element 34. The clutch element 30 which is secured to the gear 28 is also located in the recess and the two elements are normally held in spaced relation by an expansile coiled spring 67 on the shaft between the gear 36 and a thrust bearing 68 abutting the inner end of the sleeve 63. Thrust bearings 69 and 70 are also provided between the head 46 and the hub 64 and between the plate 47 and the shouldered end of the sleeve 63.

The clutch 22 is operated in the same manner as the clutch 21 by means of the lever 38 pivotally connected to the shaft 24 by means of a pin 71 and having bearing faces 72 and 73 similar to the faces 59 and 60.

In order to compensate for any wear in the clutches, the pins 58 and 71 are mounted in slots 74 extending longitudinally of their respective shafts and are adapted to be adjusted in the slots by means of set screws 75. Referring to Fig. 2, it will be noted that the levers are shown as being horizontal merely for the purpose of illustrating the bearing faces. It is preferable that they hang downwardly, as shown in Fig. 1, so that their weights assisted by the springs will prevent them from coming to rest in any intermediate position, thus insuring the clutches are entirely engaged or disengaged. However, the pins 48 and the associated grooves may be so located that the levers may be in any radial position relative to their shafts.

From the foregoing description, it will be seen that improved clutches and clutch operating means have been provided which may be quickly and efficiently operated by positive snap-action.

Obviously, the present invention is not restricted to the particular embodiment thereof herein shown and described. Moreover, it is not indispensable that all the features of the invention be used conjointly, since they may be employed advantageously in various combinations and sub-combinations.

What we claim is:—

1. In a lathe apron having trains of gearing for the longitudinal and cross-feeds; positive clutch means in each of said trains; each clutch means including a pair of clutch elements; means normally holding said elements disengaged; and snap-action clutch operating means for each of said clutches, each of said clutch operating means including a shaft operatively connected to one of said clutch elements and projecting beyond the front of the apron; a rotatable plate surrounding the shaft and abutting the front of the apron; a bifurcated lever having its arms pivotally connected to the projected end of the shaft; said arms having flat side and end bearing faces arranged at an obtuse angle to each other and adapted to engage the plate, the angle between the faces being such and the pivot being so located with respect to the faces that when the end faces are engaged with the plate the clutch elements are entirely engaged and when the side faces are engaged with the plate the elements are entirely disengaged.

2. In a lathe apron having a train of gearing for the longitudinal feed, a positive clutch in said train of gearing including co-operating toothed and hardened disk members; a longitudinally movable shaft carrying said disk members and arranged to engage and disengage said clutch; and a lever pivotally connected to said shaft and having a pair of flat faces arranged at an angle to each other; a rotatable abutment plate surrounding the shaft, the faces on said lever co-operating with the abutment and being arranged to operate the clutch with a snap action.

3. In a lathe apron having trains of gearing for the longitudinal and cross-feeds; positive clutch means in each of said trains; each clutch means including a pair of clutch elements; means normally holding said elements disengaged; and snap-action clutch operating means for each of said clutches, each of said clutch operating means including a shaft operatively connected to one of said clutch elements and projecting beyond the front of the apron; a rotatable plate surrounding the shaft and abutting the front of the apron; a bifurcated lever having its arms pivotally connected to the projected end of the shaft; said arms having co-extensive, flat side and end faces arranged at an obtuse angle to each other and so located with respect to the pivot of the lever that the apex of the angle bears against the plate and forms a fulcrum for the lever when said lever is rocked on its pivot.

4. In a lathe apron having trains of gearing for the longitudinal and cross-feeds; positive clutch means in each of said trains; each clutch means including a pair of hardened disks having radial teeth; means normally holding said elements disengaged; and snap-action clutch operating means for each of said clutches, each of said clutch operating means including a shaft operatively connected to one of said clutch elements and projecting beyond the front of the apron; a lever pivoted intermediate its ends to the shaft; a plate surrounding the shaft and rotatably secured to the front of the apron; said lever having means on one end adapted to engage the plate to operate said clutch when the lever is rocked on its pivot.

In testimony, that we claim the foregoing as our own, we have hereto affixed our signatures.

ALFRED C. GETZ.
FREDERICK D. DICKAS.